United States Patent
Genio et al.

(10) Patent No.: US 8,018,586 B2
(45) Date of Patent: Sep. 13, 2011

(54) METROLOGY OF THIN FILM DEVICES USING AN ADDRESSABLE MICROMIRROR ARRAY

(75) Inventors: Edgar Genio, Santa Clara, CA (US); Edward W. Budiarto, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 337 days.

(21) Appl. No.: 12/388,173

(22) Filed: Feb. 18, 2009

(65) Prior Publication Data

US 2010/0106456 A1 Apr. 29, 2010

Related U.S. Application Data

(60) Provisional application No. 61/197,265, filed on Oct. 23, 2008.

(51) Int. Cl.
*G01N 21/00* (2006.01)
(52) U.S. Cl. .................................. 356/237.2; 356/237.1
(58) Field of Classification Search .................. 356/338, 356/429, 430, 238.1–238.3, 239.7, 237.1–237.6, 356/445, 448; 250/559.45, 559.41, 559.46, 250/559.4, 226, 216
See application file for complete search history.

(56) References Cited

U.S. PATENT DOCUMENTS

| | | | |
|---|---|---|---|
| 6,686,602 B2 * | 2/2004 | Some ........................ | 250/559.45 |
| 2002/0109110 A1 * | 8/2002 | Some et al. ................ | 250/559.4 |
| 2010/0067010 A1 * | 3/2010 | Sakai et al. ................... | 356/402 |

* cited by examiner

*Primary Examiner* — Tri T Ton
(74) *Attorney, Agent, or Firm* — Robert M. Wallace

(57) ABSTRACT

An addressable micromirror array is employed in conjunction with circuit topology navigation software to rapidly wavelength sample selected measurement points in an integrated circuit region.

7 Claims, 6 Drawing Sheets

METROLOGY OF THIN FILM DEVICES USING AN ADDRESSABLE MICROMIRROR ARRAY

CROSS-REFERENCE TO RELATED APPLICATIONS

This application claims the benefit of U.S. Provisional Application Ser. No. 61/197,265, filed Oct. 23, 2008 entitled METROLOGY OF THIN FILM DEVICES USING AN ADDRESSABLE MICROMIRROR ARRAY, by Edgar Genio, et al.

BACKGROUND

Fabrication of thin film products such as microelectronic integrated circuits is enhanced by periodic measurements of key characteristics of the product during the fabrication process, enabling on-going process adjustments to enhance quality and yield. A prominent characteristic to be measured is thin film thickness at or around a specific location or a specific circuit element. Measurements of such characteristics as film thickness are best made by analyzing the wavelength spectrum of light reflected from the feature or location of interest on the workpiece or wafer. How to infer a measurement of a quantity such as film thickness from the wavelength spectrum is known. Many measurements may be desired during the processing of each individual wafer, so that the time required to perform each measurement reduces productivity. Such measurements must be made at predetermined precise locations (i.e., at user-selected devices in the integrated circuit, for example). Optical apparatus employed to capture a wavelength spectrum reflected from a specific or user-selected device or feature in the integrated circuit must be accurately focused on the exact location of that device or feature. The problem is that the movement or re-directing of the optical apparatus from one selected device to the next in the integrated circuit requires a significant amount of time. The movement must be precise and each selected feature must be located within an array of hundreds of thousands of features included in the integrated circuit.

One way this can be accomplished is to capture a digitized planar spatial image of a larger region of the integrated circuit that is most likely to contain the selected feature or device. This larger region may be a die or a portion of a die, and the precise location of the selected feature within the region is as yet unknown. Special pattern recognition algorithms are then employed to analyze the planar spatial image of the integrated circuit using the circuit design layout used to fabricate the integrated circuit. This analysis produces the exact location in the image of the selected circuit feature or device. This location may be specified as an exact X-Y location or a picture element (pixel) in the digital image. The optics is then used re-positioned to focus reflected light from the exact location discovered by the pattern recognition algorithm onto a diffraction grating. The spectrum of light emitted by the diffraction grating forms a wavelength-distributed intensity pattern along an axis of the grating, and this intensity pattern is focused onto a line sensor such as a charge coupled device (CCD) line imager. The output of the imager provides the reflection spectrum from the selected feature. Special wavelength analysis algorithms are employed to analyze this spectrum and infer from it a measured characteristic of the selected feature, such as thin film thickness for example. A limitation of this approach is that the mechanical re-positioning of the optics to each precisely determined location on the wafer is time consuming and must be performed for each successive measurement.

Another more sophisticated way in which thin film measurements at user-selected locations may be performed is to employ a spectral mapping and analysis of the entire region containing the user-selected feature. This latter approach eliminates the need to mechanically re-position the optics after capturing the image of the larger region. Specifically, the wavelength spectrum of each pixel of a large region most likely to contain the user-selected circuit feature is first obtained. Each row of pixels in the spatial image is passed through a line spectrometer grating whose output is focused on a CCD line sensor, producing columns of intensity values sorted by wavelength. This involves mapping each row of pixels in the spatial image into plural columns (one for each spatial image pixel) of spectral intensity values. Special algorithms analyze the spectra of all the pixels in the image of the large region and note contrasts in wavelength responses between different spatial regions. These contrasts point to boundaries between adjacent regions each containing common circuit features that differ from the common circuit features of the adjoining region. The locations of these boundaries may be correlated to the circuit design layout used to fabricate the integrated circuit. This correlation provides a precise mapping of locations in the image of the large region of the integrated circuit to features in the circuit design layout. From this mapping, the location of the user-selected feature or device is immediately deduced, identifying the exact pixel in the image of this feature. The wavelength spectrum of that pixel was previously obtained during the prior acquisition of the wavelength spectra of all pixels in the image of the large region. Therefore, the spectra of the identified pixel is simply fetched and provided for use by a special wavelength analysis algorithms to analyze this spectrum and infer from it a measured characteristic of the selected feature, such as thin film thickness for example. While this second approach eliminates the need for any mechanical repositioning of the optics or to focus the optics on any particular pixel, it is limited because the initial step of processing an array of wavelength spectra of all pixels in the image of the large region is computational intensive and represents a very large burden.

What is needed is a way of rapidly measuring plural user-selected circuit features on a wafer without having to re-position optics to each feature location and without imposing a large computational burden.

SUMMARY

A wafer metrology system includes a camera and an addressable micromirror array both focused on a wafer. The system performs a measurement at a selected location or point on the surface of a semiconductor wafer having thin film features formed in accordance with an integrated circuit design. The system acquires a two-dimensional spatial image of a region of the wafer surface containing the selected point. The system processes the spatial image of the region with reference to the integrated circuit design and with reference to the selected location, to determine at least one pixel of the spatial image containing or adjacent the selected location. The system focuses an addressable micromirror array onto the region whereby individual micromirrors of the array receive light from corresponding individual areas of the selected region, the selected areas corresponding to respective pixels of the spatial image. The system correlates the one pixel with at least one of the micromirrors of the array and orients the at least one micromirror to reflect light from the wafer surface to a wavelength separation element to generate a wavelength-dispersed image. The system directs the remaining micromirrors to not reflect light from the wafer surface to the wavelength separation element. A spectral image processor processes the wavelength dispersed image to deduce the value of a selected characteristic at the selected location of the surface of the wafer.

BRIEF DESCRIPTION OF THE DRAWINGS

So that the manner in which the exemplary embodiments of the present invention are attained and can be understood in detail, a more particular description of the invention, briefly summarized above, may be had by reference to the embodiments thereof which are illustrated in the appended drawings. It is to be appreciated that certain well known processes are not discussed herein in order to not obscure the invention.

Figure 1A:
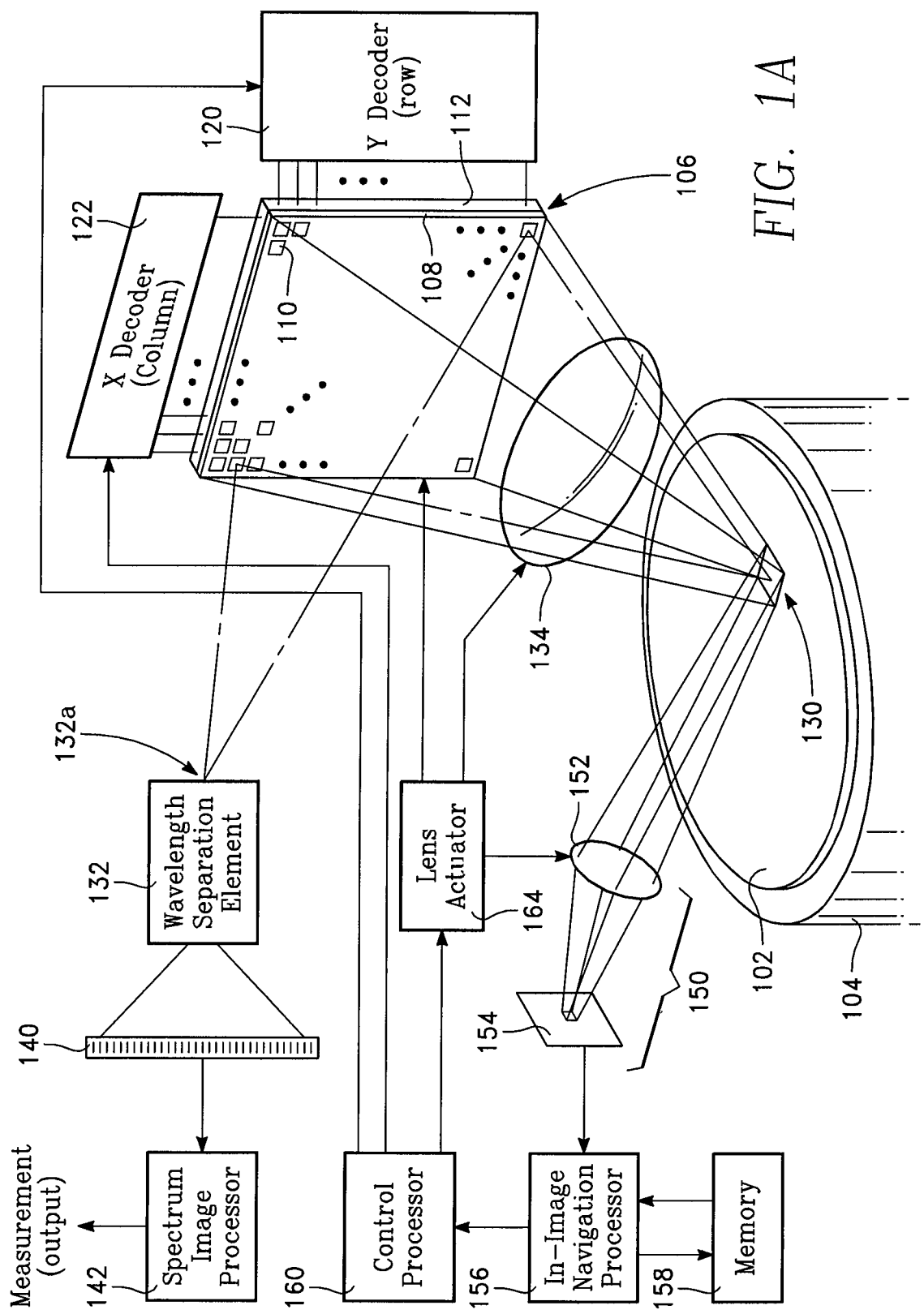
FIG. 1A illustrates a wafer metrology system in accordance with one embodiment.

To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION

Figure 1B:
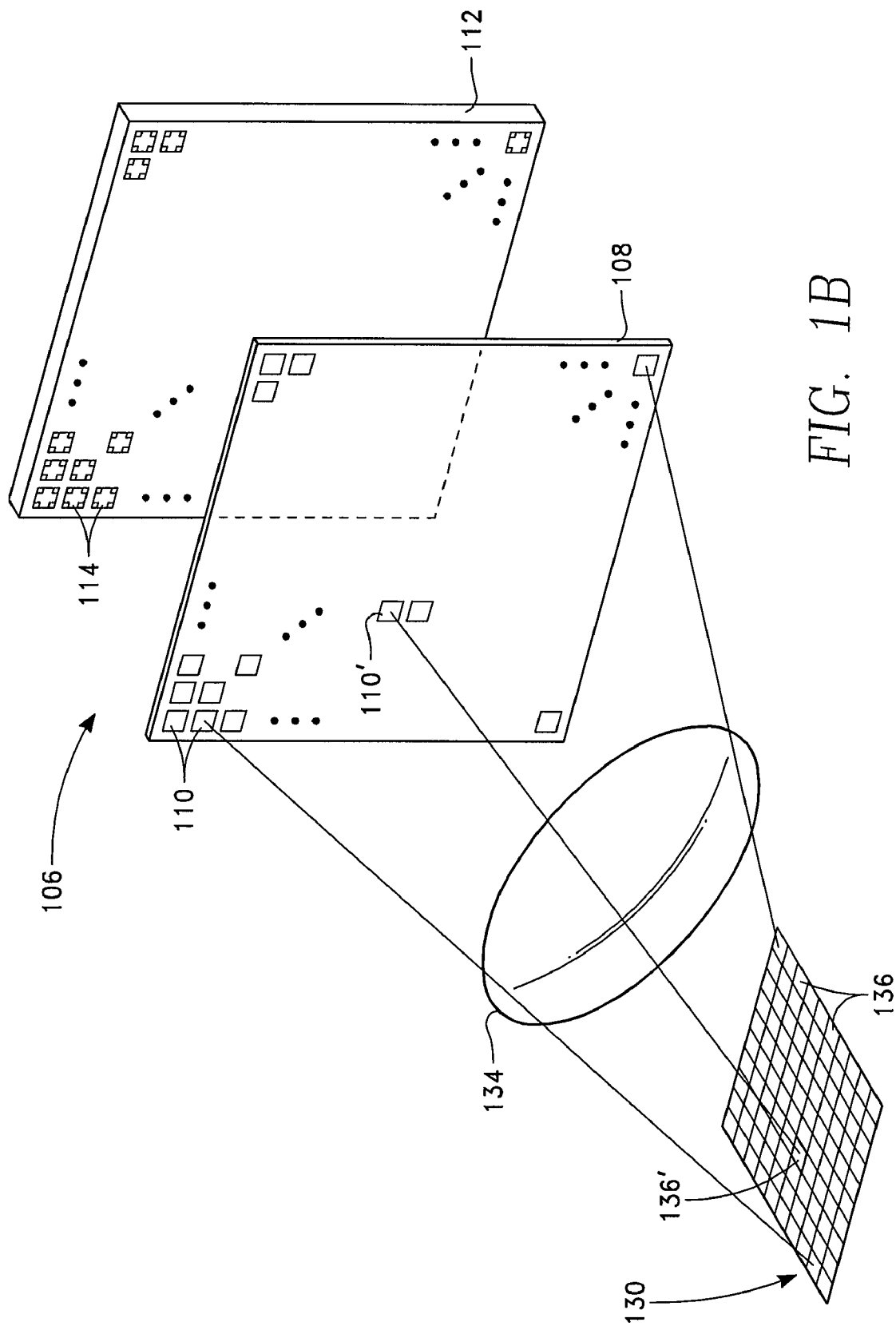
FIG. 1B is an exploded view corresponding to a portion of FIG. 1A.

Referring to FIGS. 1A and 1B, a workpiece such as a semiconductor wafer 102 is supported on a pedestal or table 104. An addressable digital micromirror array 106 faces the wafer 102. The micromirror array 106 may be a Digital Micromirror Device (DMD) by Texas Instruments Incorporated, and is available through Digital Light Innovations (DLI), 3201 Industrial Terrace, Suite 120, Austin, Tex. 78758. The micromirror array 106 has an array 108 of many micromirrors 110, the micromirrors being closely spaced so as to provide roughly 70% area coverage. The micromirror array 106 further includes a mirror control layer 112 behind the micromirrors 110, the control layer 112 consisting of actuators 114 depicted in the exploded partial view of FIG. 1B for controlling the orientation of each one of the micromirrors 110 individually. The actuators 114 may, for example, be electronic or electrooptical devices, each actuator 114 individually coupled to (or integrated with) a corresponding one of the micromirrors 110. The micromirrors 110 may be arranged generally in a plane in periodically spaced rows and columns, the actuators 114 in the control layer 112 being similarly arranged. The actuators 114 are individually addressable, for example by row and column decoders 120, 122, respectively, so that the orientation of each micromirror 110 may be individually controlled.

The micromirror array 106 reflects light from a selected area 130 on the wafer 102 to a wavelength separation element 132. The wavelength separation element 132 may be a diffraction grating or a prism, for example, and will be referred to hereinafter as a grating. A focus element (e.g., a lens assembly) 134 focuses light reflected from the selected area 130 onto the micromirror array 106, so that (as indicated in FIG. 1B) light from each image element or pixel 136 in the selected area 130 is directed to a corresponding one of the micromirrors 110. Each micromirror 110 is initially oriented to direct that light to the same point 132a on the grating 132. The light incident on the point 132a of the grating 132 is converted to a line image or spectrum of intensities distributed by wavelength, this line image being captured by an optical sensor 140 which may be a CCD line imager. The spectrum or line image captured by the line imager 140 is output to a spectrum image processor 142. The spectrum image processor 142 employs conventional algorithms to measure a characteristic (such as thin film thickness) from the spectrum or wavelength distribution of intensities represented by the output of the line sensor 140.

A camera vision system or microscope 150 consisting of a lens system 152 and a two-dimensional CCD image sensor 154 has a field of view focused on the selected area 130 of the wafer 102. The two-dimensional spatial image of the selected area 130 is captured by the image sensor 154 and fed as data to an in-image navigation processor 156 having a memory 158 containing data representing the circuit design layout of the integrated circuitry on the surface of the wafer 102. The in-image navigation processor 156 is capable of identifying the precise location of a user-selected circuit feature within the two-dimensional image of the selected area 130 captured by the microscope. Specifically, the in-image navigation processor 156 can identify the particular one of the pixels 136 representing the selected area 130 that contains the user-selected circuit feature. The in-image navigation processor 156 may employ geometric pattern recognition software sold by Cognex Corporation of Natick, Mass. The camera vision system 150 may be obtained from Cognex Corporation.

In one embodiment, the micromirror array 106 may be controlled by a control processor 160. The control processor 160 may also control the optical apparatus of the camera vision system 150 (specifically, the lens system 152) and the focusing lens system 134, in order to ensure that both the camera vision system 150 and the micromirror array 106 are focused on the same selected area 130 of the wafer 102. Once the in-image navigation processor 156 identifies the particular one of the pixels 136 containing the user-selected circuit feature, the control processor 160 uses this information to direct all of the micromirrors 110 away from the grating 132 except for the one micromirror focused on the pixel identified by the in-image navigation processor 156. For example, in FIG. 1B, the pixel 136' may be the one identified by the in-image navigation processor 156. In this case, the control processor 160 sends commands through the row and column decoders 120, 122 (FIG. 1A) to direct all the micromirrors 110 away from the grating 132 with the exception of the micromirror 110' that is focused on the pixel 136'. The control processor 160 then directs the spectrum image processor 142 to fetch the spectrum image data from the line sensor 140 and process that data to compute the desired measured quantity such as film thickness.

No movement of optical lens assemblies is required once the image of the desired selected area 130 has been acquired by the camera vision system 150 and by the micromirror array 106. Many different circuit features selected by the user within the area 130 may be measured or analyzed in rapid succession without any mechanical movement of lenses or optical assemblies. The only motion required is performed by micromirror actuators 114, which are virtually instantaneous compared to the slow time response of actuators required to move optical lens assemblies. Moreover, spectral decomposition and wavelength-based image processing of the entire selected area 130 is not required, thereby minimizing the computational burden of each measurement.

Figure 2:
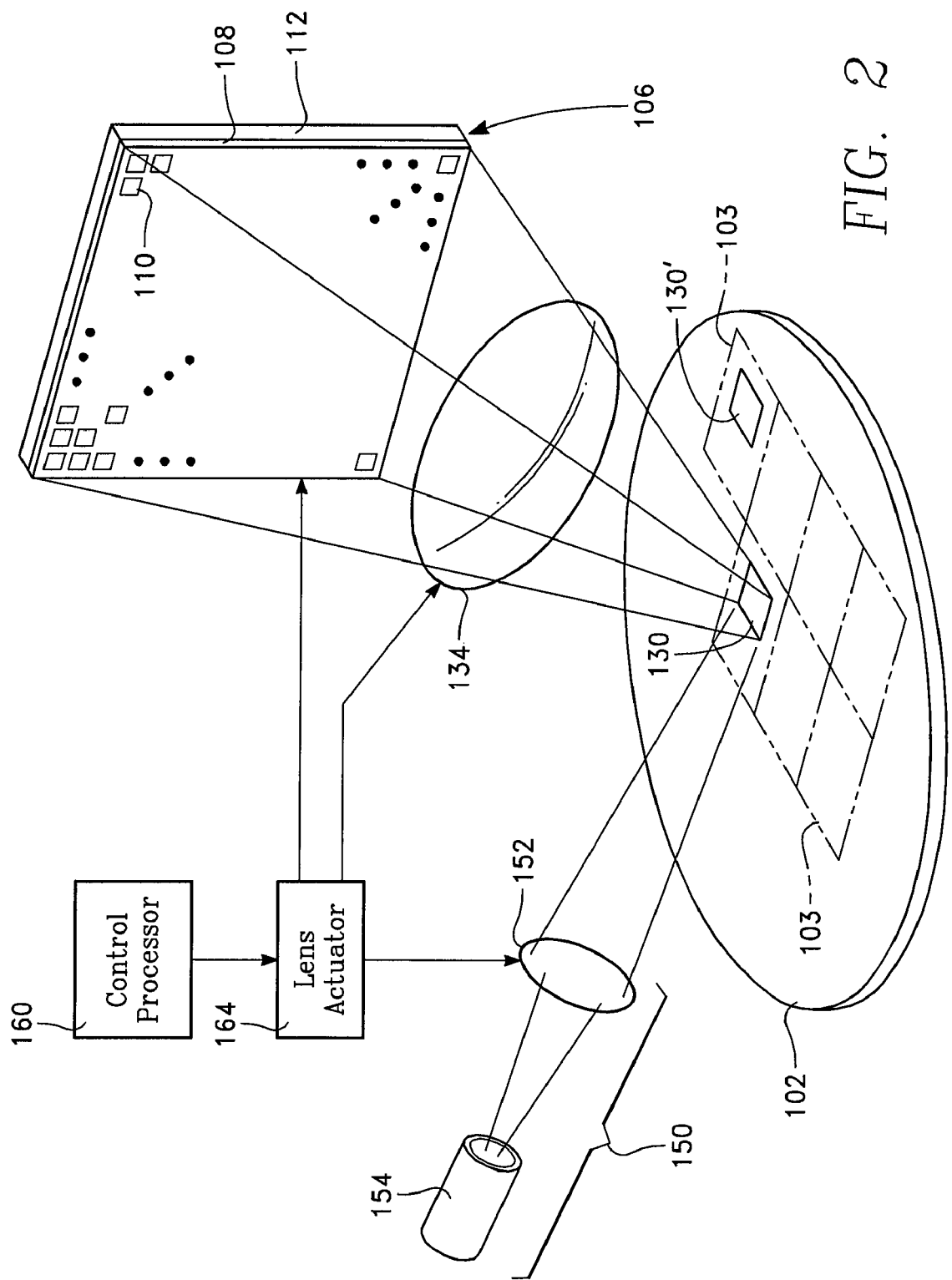
FIG. 2 is an enlarged view corresponding to a portion of FIG. 1A including the wafer.

FIG. 2 illustrates how the control processor 160 may position the lens assemblies 152 and 134 to inspect a selected area 130 lying within one of many die 103 into which the surface of the wafer 102 is divided, each die constituting a single integrated circuit. After measurements have been taken at all the user-selected circuit features in a particular selected area 130, the control processor 160 may manipulate the lens assemblies 134, 152 (using an actuator apparatus 164) to direct the camera vision system 150 and the micromirror array 106 to a different area 130' for a new series of measurements at various user-selected features within the new area 130'. The new area 130' may be adjacent the prior area 130 or may be located in a completely different or opposite region of the wafer from the prior area 130. This movement between successive large areas 130, 130' involves a relatively slow movement of the micromirror array 106 and camera vision system 150 and/or the large lens assemblies 134, 152. In comparison, the action of the micromirror actuators 114 to position the various micromirrors 110 toward or away from illuminating the grating 132 is nearly instantaneous.

Figure 3:
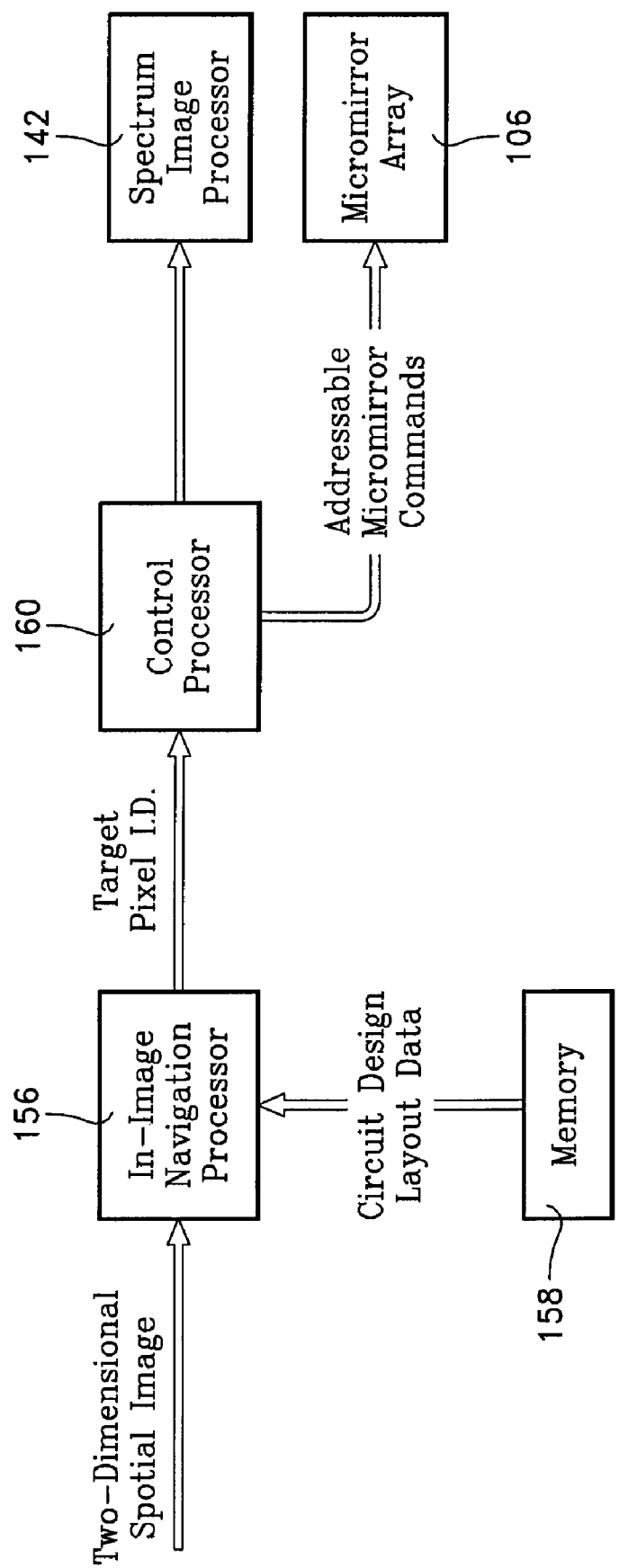
FIG. 3 is a block diagram illustrating a hierarchy of processors in the system of FIG. 1A.

FIG. 3 is a block diagram depicting the command hierarchy among the processors 142, 156 and 160. As indicated in FIG. 3, the in-image navigation processor 156 is furnished with a two-dimensional image of the selected area 130 (from the camera vision system 150) as well as the circuit design layout data (from the memory 158) defining the topology of the integrated circuit features on the wafer 102. In response to identification of a user-selected circuit feature, the processor 156 identifies the pixel in the two-dimensional image corresponding to the location of that feature and transmits this pixel identification to the control processor 160. The control processor 160 commands the micromirror array 106 to disable all the micromirrors 110 with the exception of the one micromirror corresponding to the identified pixel. The control processor 160 then commands the spectrum image processor 142 to capture the spectrum image form the grating 140 and process the captured image to perform the desired wave-length computed measurement.

Figure 4:
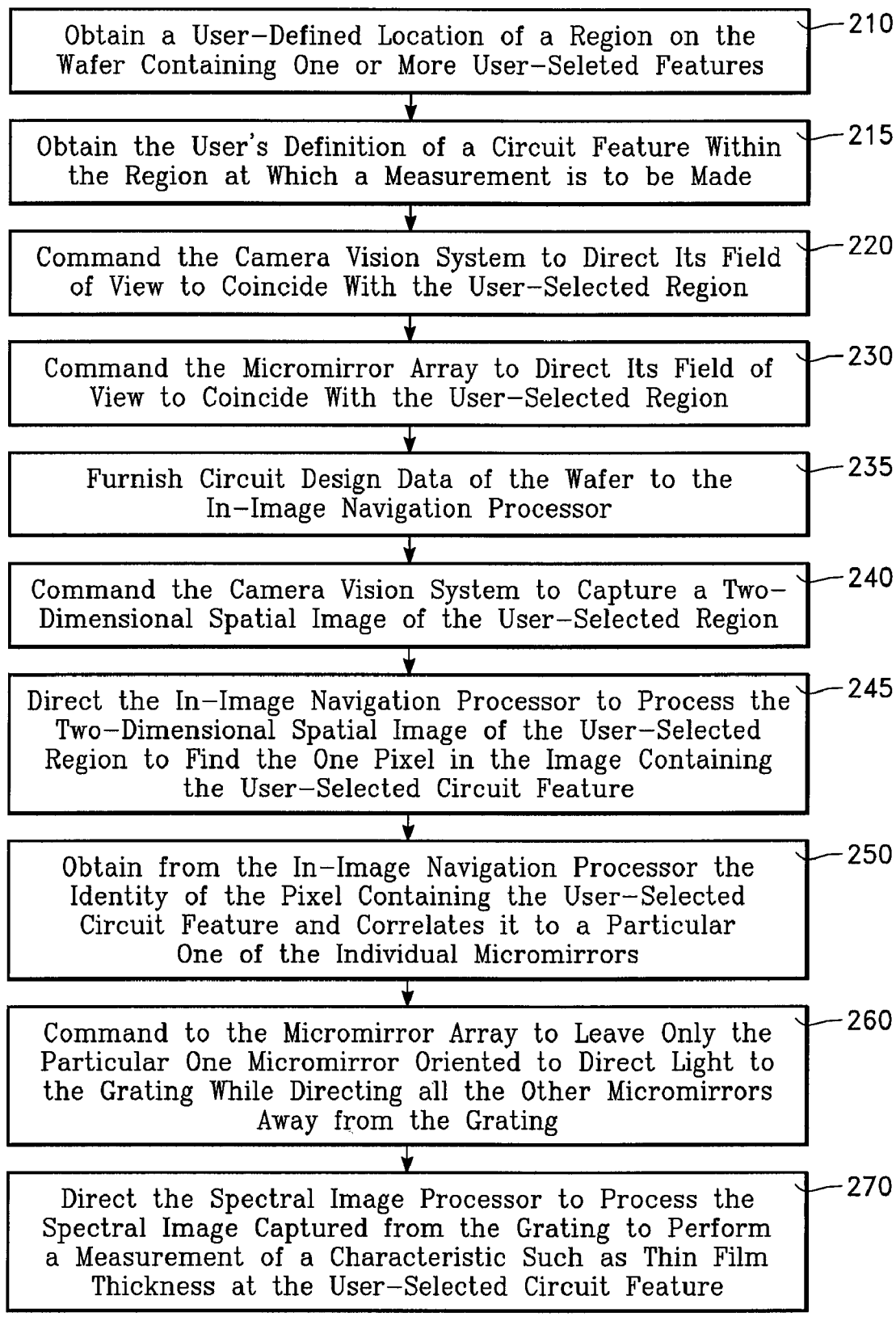
FIG. 4 is a flow diagram illustrating a method in accordance with an embodiment.

FIG. 4 is a block flow diagram depicting a method in accordance with one embodiment. The method depicted in FIG. 4 may be carried out, for example, by the control processor 160. Referring to FIG. 4, the user may define the location of the large region 130 that contains one or more user-selected circuit features or points at which measurements are to be made, such as measurements of film thickness for example (block 210 of FIG. 4). In addition, the user may specify one or more circuit features or point locations within the large region 130 at which measurements are to be made (block 215 of FIG. 4). The control processor 160 then commands the camera vision system 150 to direct its field of view to coincide with the large region 130 specified by the user (block 220 of FIG. 4). The control processor also commands the addressable micromirror array 106 to direct its field of view to coincide with the large region 130 (block 230 of FIG. 4). At this time, there is a one-to-one correspondence between image locations or pixels in the digital image acquired by the camera vision system 150 and respective micromirrors 110 in the micromirror array 106. Design data defining the circuit design topology of the wafer 102 is provided to the in-image navigation processor 156 (block 235 of FIG. 4). The control processor 160 then directs the camera vision system 150 to capture a two-dimensional spatial image of the large region 130 (block 240 of FIG. 4) and directs the in-image navigation processor 156 to process the two-dimensional spatial image of the large region 130 to find the one pixel in the image containing a first one of the user-selected circuit features (block 245 of FIG. 4). The control processor 160 fetches the identity of that one pixel and correlates it to a particular one of the micromirrors 110 (block 250 of FIG. 4). The control processor 160 then sends appropriate commands to the micromirror array 106 (e.g., to the row and column decoders 120, 122) to leave only the particular one micromirror oriented to direct light to the grating 132 while directing all the other micromirrors 110 away from the grating 132 (block 260). This creates a spectral (wavelength-dispersed) image at the line sensor 140. The control processor 160 then directs the spectral image processor 142 to process the spectral image captured by the line sensor 140 to perform a measurement of a characteristic such as thin film thickness at the user-selected circuit feature (block 270 of FIG. 4).

The operations of blocks 245, 250, 260 and 270 may be repeated for successive user-defined circuit features contained within the large region 130.

In one mode, the pixel size in the two-dimensional digital image captured by the camera vision system 150 and the micromirror size and spacing may both be so fine that a given user-selected circuit feature may occupy a neighborhood of adjacent pixels. In this case, the control processor 160 may enhance signal-to-noise ratio by enabling light from the corresponding group of adjacent micromirrors 110 to direct light to the grating 132, so that the single grating point 132*a* receives a sum of light from the group of pixels/micromirrors 110. The signal-to-noise ratio of the resulting spectral image created by the grating 132 and captured by the line sensor 140 is enhanced in proportion to the number of contributing pixels or micromirrors.

Figure 5:
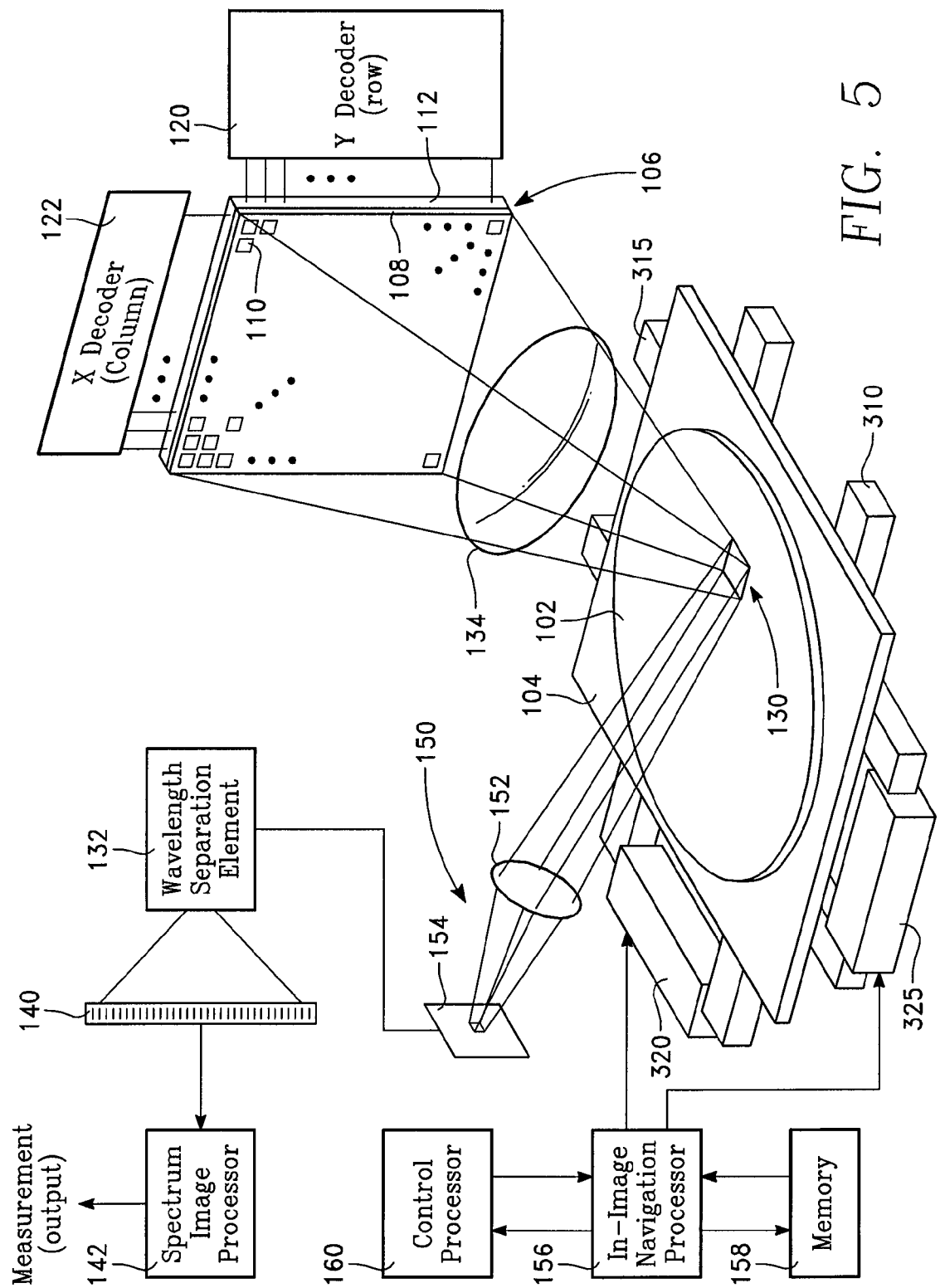
FIG. 5 depicts a wafer metrology system in accordance with a related embodiment.

FIG. 5 depicts another embodiment in which the micromirror array 106 and the camera vision system 150 are directed to a selected area 130 of the wafer 102 by moving the wafer rather than moving the optical components such as the camera vision system 150 and the micromirror array 106. In the embodiment of FIG. 5, orthogonal gantry rails 310, 315 support the wafer table 104 and provide two-dimensional shifting of the wafer table 104 under control of respective X-stage and Y-stage actuators 320, 325. The control processor 160 may govern the actuators 320, 325.

While the foregoing is directed to embodiments of the present invention, other and further embodiments of the invention may be devised without departing from the basic scope thereof, and the scope thereof is determined by the claims that follow.

What is claimed is:

1. A method of performing a measurement at a selected location or point on the surface of a semiconductor wafer having thin film features formed in accordance with an integrated circuit design, comprising:

identifying a region of the workpiece surface containing the selected location;

acquiring a two-dimensional spatial image of said region;

processing said spatial image of said region with reference to said integrated circuit design and with reference to said selected location, to determine at least one pixel of said spatial image containing or adjacent said selected location;

focusing an addressable micromirror array onto said region whereby individual micromirrors of said array receive light from corresponding individual areas of said selected region, said selected areas corresponding to respective pixels of said spatial image;

correlating said one pixel with at least one of said micromirrors of said array and orienting said at least one micromirror to reflect light from said wafer surface to a wavelength separation element to generate a wavelength-dispersed image, and directing the remaining micromirrors to not reflect light from said wafer surface to said wavelength separation element;

processing said wavelength dispersed image to deduce the value of a selected characteristic at said selected location of said surface of said wafer;

wherein said selected location is one of a succession of selected locations lying within said region, said method further comprising:

processing said spatial image so as to determine plural pixels of said spatial image corresponding to said plural selected locations;

correlating said plural pixels to respective ones of said micromirrors; and directing successive ones of said respective micromirrors to reflect light from said wafer surface to said wavelength separation element one at a time to generate a succession of wavelength dispersed images corresponding to said succession of said plural selected locations.

2. The method of claim 1 wherein said selected characteristic is thin film thickness.

3. The method of claim 1 wherein each of said micromirrors corresponds to a single pixel of said spatial image.

4. The method of claim 1 wherein each of said micromirrors corresponds to plural neighboring pixels of said spatial image.

5. The method of claim 1 wherein said selected location lies in pixels of said spatial image corresponding to plural neighboring ones of said micromirrors.

6. The method of claim 5 wherein said orienting said at least one micromirror comprises orienting said plural neighboring micromirrors to reflect light from said wafer surface to said wavelength separation element.

7. The method of claim 1 wherein said orienting said at least one micromirror to reflect light from said wafer surface to a wavelength separation element comprises directing light from said one micromirror to a point on said wavelength separation element.

* * * * *